(12) United States Patent
Peng et al.

(10) Patent No.: US 10,551,725 B2
(45) Date of Patent: Feb. 4, 2020

(54) PHOTOGRAPHIC ASSEMBLY AND UNMANNED AERIAL VEHICLE

(71) Applicant: AUTEL ROBOTICS CO., LTD., Shenzhen, Guangdong (CN)

(72) Inventors: Huai Peng, Guangdong (CN); Zhengli Zhang, Guangdong (CN); Zhipeng Ji, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 0 days.

(21) Appl. No.: 16/127,766

(22) Filed: Sep. 11, 2018

(65) Prior Publication Data

US 2018/0373127 A1   Dec. 27, 2018

Related U.S. Application Data

(63) Continuation-in-part of application No. PCT/CN2017/115051, filed on Dec. 7, 2017.

(30) Foreign Application Priority Data

May 2, 2017   (CN) .......................... 2017 1 0299375

(51) Int. Cl.
*G03B 17/56* (2006.01)
*B64C 39/02* (2006.01)
(Continued)

(52) U.S. Cl.
CPC .......... *G03B 17/561* (2013.01); *B64C 39/024* (2013.01); *B64D 47/08* (2013.01);
(Continued)

(58) Field of Classification Search
None
See application file for complete search history.

(56) References Cited

U.S. PATENT DOCUMENTS 9,280,038 B1 * 3/2016 Pan ..................... G03B 17/561
2014/0013870 A1   1/2014 Brauchle et al.
(Continued)

FOREIGN PATENT DOCUMENTS

CN   204372480 U   6/2015
CN   105667818 A   6/2016
(Continued)

OTHER PUBLICATIONS

The International Search Report dated Mar. 7, 2018; PCT/CN2017/115051.

*Primary Examiner* — William B Perkey (57) ABSTRACT

The present invention provides a photographic assembly, including a pitch motor, a roll motor and a camera. A second rotor portion of the pitch motor is coupled to the third stator portion of the roll motor and a third rotor portion of the roll motor is coupled to the camera, so that a connection manner of the photographic assembly is a pitch-roll manner. When the roll motor is working, a displacement variation of the camera along a pitch axis is small. That is, a rotation interference phenomenon is weakened, so that a rotation space that needs to be reserved between the camera and the roll motor is correspondingly reduced. That is, distances between the centre of gravity of the camera and the motors are also decreased. Therefore, the photographic assembly becomes more compact at some portions, thereby achieving an objective that the volume, the weight, and the moment of inertia of the photographic assembly are reduced.

18 Claims, 6 Drawing Sheets

(51) Int. Cl.
*B64D 47/08* (2006.01)
*F16M 11/10* (2006.01)
*F16M 11/20* (2006.01)
*F16M 13/02* (2006.01)
*G03B 15/00* (2006.01)

(52) U.S. Cl.
CPC ......... *F16M 11/10* (2013.01); *F16M 11/2071* (2013.01); *F16M 13/02* (2013.01); *G03B 15/006* (2013.01); *B64C 2201/127* (2013.01)

(56) References Cited

U.S. PATENT DOCUMENTS

| | | | |
|---|---|---|---|
| 2018/0246394 A1* | 8/2018 | Zhang | H02K 1/2793 |
| 2018/0373127 A1* | 12/2018 | Peng | F16M 11/04 |
| 2019/0011077 A1* | 1/2019 | Chen | G05B 6/02 |
| 2019/0154191 A1* | 5/2019 | Ma | F16M 11/08 |
| 2019/0162358 A1* | 5/2019 | Wang | F16M 11/205 |
| 2019/0163035 A1* | 5/2019 | Mita | G03B 15/006 |
| 2019/0163039 A1* | 5/2019 | Zhang | G03B 17/561 |

FOREIGN PATENT DOCUMENTS

| | | |
|---|---|---|
| CN | 106412439 A | 2/2017 |
| CN | 206093398 U | 4/2017 |
| CN | 106814754 A | 6/2017 |

* cited by examiner

PHOTOGRAPHIC ASSEMBLY AND UNMANNED AERIAL VEHICLE

CROSS REFERENCE

The present application is a continuation in part of International Application NO. PCT/CN2017/115051, filed on Dec. 7, 2017, which claims priority to Chinese Patent Application No. 201710299375.6, filed on May 2, 2017 and entitled "PHOTOGRAPHIC ASSEMBLY", both of which are incorporated herein by reference in their entireties.

TECHNICAL FIELD

The present invention relates to the field of unmanned aerial vehicle technologies, and in particular, to a photographic assembly applied to an unmanned aerial vehicle and an unmanned aerial vehicle using same.

RELATED ART

Gimbals are mounted on bearer members as supporting devices for mounting and fastening electrical devices such as cameras. Gimbals are widely applied to fields such as photographing, shooting and monitoring. In the field of unmanned aerial vehicle technology applications, a gimbal is generally fastened to a body of an unmanned aerial vehicle acting as a bearer member, and a photographic device (such as a camera or a video camera) used for aerial photographing is carried by the gimbal, to obtain particular-type environment information (for example, a remote sensing image). Generally, it is defined that during flight, the unmanned aerial vehicle has attitudes in three directions: yaw, roll and pitch. The attitudes in three directions are respectively performed by rotating around a yaw axis, a roll axis and a pitch axis. Correspondingly, according to the optical axis of a lens of the camera, the gimbal is also defined to have three similar movement axes, to compensate for changes of the attitudes of the unmanned aerial vehicle. A rotation axis between a gimbal support and the unmanned aerial vehicle is a yaw axis, a rotation axis that is of the gimbal and that has a same direction as that of the optical axis of the lens of the camera is a roll axis, and a rotation axis that is of the gimbal and that is perpendicular to the yaw axis and the roll axis is a pitch axis.

Figure 1:
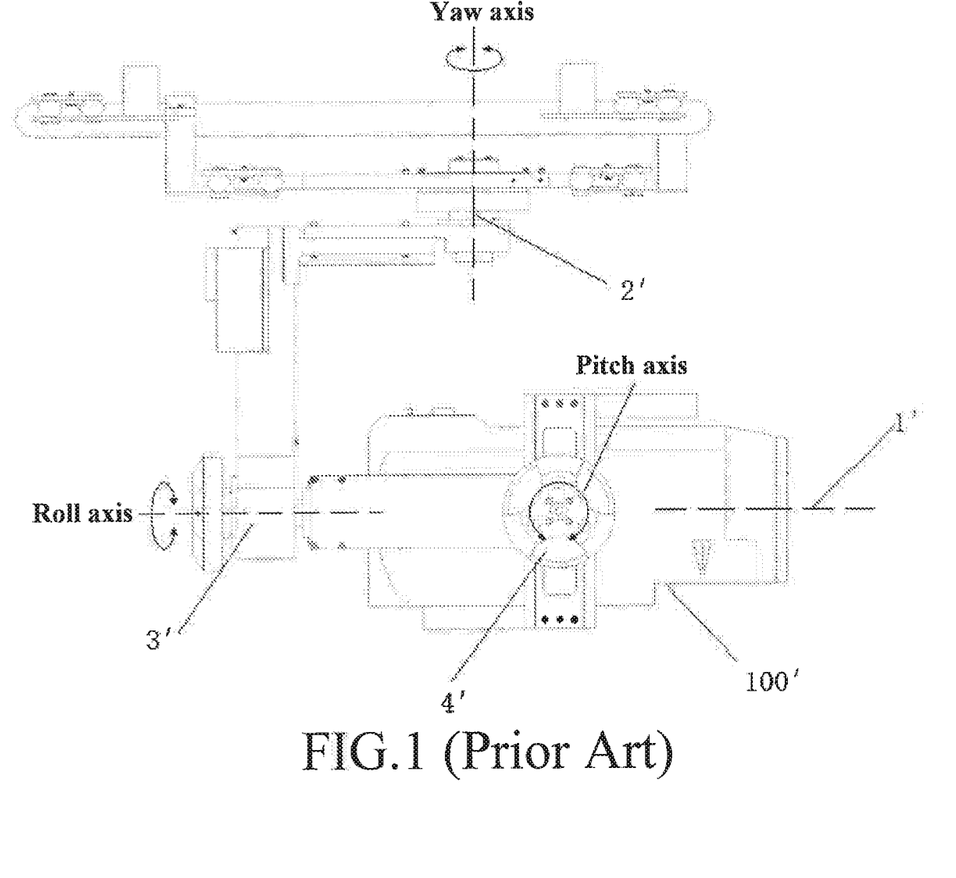
FIG. 1 is a schematic diagram of a photographic assembly in the prior art.

Currently, as shown in FIG. 1, a connection manner of a camera on a gimbal is generally a yaw-roll-pitch manner. According to a direction of the optical axis 1' of a lens, rotation motors from an unmanned aerial vehicle to a camera 100' are a yaw motor 2', a roll motor 3' and a pitch motor 4' in sequence, that is, the rotation axes are a yaw axis, a roll axis and a pitch axis in sequence. In a process in which the camera 100' is mounted or replaced, to ensure control precision of the gimbal and an aerial photographing effect of the unmanned aerial vehicle, a type and a mounting location of the camera 100' on the gimbal cannot be randomly changed. In addition, corresponding rotation axes are disposed in the gimbal according to the yaw-roll-pitch sequence, so that in a process in which the camera 100' rotates around the pitch axis, because the length of a projection of an envelope curve of a route of the camera 100' along the roll axis is greater than the length of the camera 100 along the roll axis. Consequently, during rotation of the camera 100, an interference phenomenon easily occurs between the camera 100' and the roll motor 3'. Therefore, a corresponding rotation space needs to be reserved between the camera 100' and the roll motor 3' to avoid interference between the camera 100' and the roll motor 3', so that the camera 100' is moved outward relative to the roll motor 3', that is, the centre of gravity of the camera 100' is moved outward relative to the gimbal support. To balance the counterweight of the gimbal, length of a connection arm of the roll motor 3' on the roll axis and length of a connection aim on the pitch axis of the pitch motor 4' on the pitch axis need to be correspondingly increased. Consequently, the volume and the weight of the gimbal are increased and the moment of inertia of the camera 100' is increased, finally affecting cruise duration of the unmanned aerial vehicle.

SUMMARY

In view of this, a technical problem needs to be resolved in the present invention is to overcome technical defects in the prior art that the volume and the weight of a gimbal are increased because the centre of gravity of a camera is moved outward due to a yaw-roll-pitch connection manner of a photographic assembly.

To achieve the foregoing objective, the present invention provides a photographic assembly, comprising:

a pitch motor, comprising a second stator portion and a second rotor portion coupled to the second stator portion, where the second rotor portion is capable of rotating around a pitch axis relative to the second stator portion;

a roll motor, comprising a third stator portion and a third rotor portion coupled to the third stator portion, where the third rotor portion is capable of rotating around a roll axis relative to the third stator portion; and a camera, the camera being coupled to the third rotor portion of the roll motor;

where an optical axis of the camera is coincides with or parallel to the roll axis;

where the second rotor portion of the pitch motor is coupled to the third stator portion of the roll motor.

In an embodiment of the present invention, where the second rotor portion of the pitch motor is connected to the third stator portion of the roll motor by a pitch axis connection arm.

In an embodiment of the present invention, where the pitch axis connection arm comprises a first arm and a second arm connected to the second arm;

where the first arm is connected to the second rotor portion of the pitch motor and the first arm is substantially parallel to the roll axis;

where the second arm is connected to the third stator portion of the roll motor and the second arm is substantially perpendicular to the roll axis.

In an embodiment of the present invention, where a distance between the first arm and the roll axis is greater than a maximum radius that the camera rotates around the roll axis.

In an embodiment of the present invention, the photographic assembly further comprises a yaw motor, the yaw motor comprising a first stator portion and a first rotor portion coupled to the first stator portion, where the first rotor portion is capable of rotating around a yaw axis relative to the first stator portion and the first rotor portion is coupled to the second stator portion of the pitch motor.

In an embodiment of the present invention, where the first rotor portion is connecting portion is connected to the second stator portion of the pitch motor by a yaw axis connection arm.

In an embodiment of the present invention, where the yaw axis connection arm comprises a first portion and a second portion connected to the first portion;

where the first portion is connected to the first rotor portion of the yaw motor and the first portion is substantially perpendicular to the yaw axis;

where the second portion is connected to the second stator portion of the pitch motor and the second portion is substantially parallel to the yaw axis.

In an embodiment of the present invention, the photographic assembly further comprises a mounting frame coupled to the third rotor portion of the roll motor, where the camera is detachably connected to the mounting frame.

In an embodiment of the present invention, where the mounting frame is provided with a bind buckle for detachably connecting the camera to the mounting frame.

In an embodiment of the present invention, where the camera comprises a body and a lens coupled to the body, the body being coupled to the third rotor portion of the roll motor and the optical axis of the lens is coincided with or parallel to the roll axis.

In an embodiment of the present invention, where a length of the body along the pitch axis is greater than a length of the body along the roll axis.

In an embodiment of the present invention, where a length of the lens along the roll axis is less than or equal to twice a length of the body along the roll axis.

To achieve the foregoing objective, the present invention further provides an unmanned aerial vehicle, comprising:

a vehicle body;

a gimbal base, coupled to the vehicle body;

a vibration reduction apparatus sandwiched between the vehicle body and the gimbal base; and a photographic assembly, the photographic assembly being connected to the gimbal base;

where the photographic assembly comprises:

a pitch motor, comprising a second stator portion and a second rotor portion coupled to the second stator portion, where the second rotor portion is capable of rotating around a pitch axis relative to the second stator portion;

a roll motor, comprising a third stator portion and a third rotor portion coupled to the third stator portion, where the third rotor portion is capable of rotating around a roll axis relative to the third stator portion; and a camera, the camera being coupled to the third rotor portion of the roll motor;

where an optical axis of the camera is coincides with or parallel to the roll axis;

where the second rotor portion of the pitch motor is coupled to the third stator portion of the roll motor.

In an embodiment of the present invention, where the second rotor portion of the pitch motor is connected to the third stator portion of the roll motor by a pitch axis connection arm.

In an embodiment of the present invention, where the pitch axis connection arm comprises a first arm and a second arm connected to the second arm;

where the first arm is connected to the second rotor portion of the pitch motor and the first arm is substantially parallel to the roll axis;

where the second arm is connected to the third stator portion of the roll motor and the second arm is substantially perpendicular to the roll axis.

In an embodiment of the present invention, where a distance between the first arm and the roll axis is greater than a maximum radius that the camera rotates around the roll axis.

In an embodiment of the present invention, the photographic assembly further comprises a yaw motor, the yaw motor comprising a first stator portion and a first rotor portion coupled to the first stator portion, where the first rotor portion is capable of rotating around a yaw axis relative to the first stator portion and the first rotor portion is coupled to the second stator portion of the pitch motor.

In an embodiment of the present invention, where the first rotor portion is connecting portion is connected to the second stator portion of the pitch motor by a yaw axis connection arm.

In an embodiment of the present invention, where the yaw axis connection arm comprises a first portion and a second portion connected to the first portion;

where the first portion is connected to the first rotor portion of the yaw motor and the first portion is substantially perpendicular to the yaw axis;

where the second portion is connected to the second stator portion of the pitch motor and the second portion is substantially parallel to the yaw axis.

In an embodiment of the present invention, the photographic assembly further comprises a mounting frame coupled to the third rotor portion of the roll motor, where the camera is detachably connected to the mounting frame.

In an embodiment of the present invention, where the mounting frame is provided with a bind buckle for detachably connecting the camera to the mounting frame.

In an embodiment of the present invention, where the camera comprises a body and a lens coupled to the body, the body being coupled to the third rotor portion of the roll motor and the optical axis of the lens is coincided with or parallel to the roll axis.

In an embodiment of the present invention, where a length of the body along the pitch axis is greater than a length of the body along the roll axis.

In an embodiment of the present invention, where a length of the lens along the roll axis is less than or equal to twice a length of the body along the roll axis.

By means of the photographic assembly and the unmanned aerial vehicle provided in the present invention, when the roll motor is working, the displacement variation of the camera along the pitch axis is small, that is, a rotation interference phenomenon is weakened, so that a rotation space that needs to be reserved between the camera and the pitch motor is correspondingly reduced. Correspondingly, a distance between the centre of gravity of the camera and the roll motor is also decreased. That is, distances between the centre of gravity of the camera and the motors are decreased. Therefore, the photographic assembly becomes more compact at some portions, thereby achieving the objective that the volume, the weight, and the moment of inertia are reduced. When the weight is reduced to some extent, even a small-sized motor may be used to drive the photographic assembly.

BRIEF DESCRIPTION OF THE DRAWINGS

To clearly describe the technical solutions of the specific implementations of present invention, the following further describes the present invention in detail according to the specific embodiments of the present invention and with reference to the accompanying drawings. Apparently, the accompanying drawings in the following description show merely some embodiments of the present invention, and a person of ordinary skill in the art may still derive drawings of other embodiments from these accompanying drawings without creative efforts.

Reference numerals in the accompanying drawings are described as follows:

100': Camera; 1': Optical axis of a lens; 2': Yaw motor; 3': Roll motor; 4': Pitch motor; 1: Yaw axis connection arm;

2: Pitch motor; 3: Pitch axis connection arm; 31: First arm;

32: Second arm; 4: Roll motor; 5: Camera; 51: Body;

52: Lens; 6: Mounting frame; 61: Bind buckle; 7: Yaw motor;

71: Yaw shaft; and 8: Gimbal base.

DETAILED DESCRIPTION

The following clearly describes the technical solutions of the present invention with reference to the accompanying drawings. Apparently, the described embodiments are some but not all of the embodiments of the present invention. All other embodiments obtained by a person of ordinary skill in the art based on the embodiments in the present invention without creative effects shall fall within the protection scope of the present invention.

In the descriptions of the present invention, it should be noted that the term "fixedly connected" may mean that two components are directly or indirectly connected, and the terms "first" and "second" are merely used for purposes of descriptions and are not intended to indicate or imply relative importance.

In addition, technical features involved in different embodiments of the present invention that are described below may be combined with each other provided that there is no conflict.

DEFINITION: The "stator portion" mentioned in the present invention is a portion of a motor that doesn't rotate. The "rotor portion" mentioned in the present invention is a portion of the motor that rotates relative to the "stator portion". For example, if a rotor of a motor rotates, the rotator of the motor is that the present invention calls "rotor portion". If the rotor of the motor doesn't rotate, the rotor of the motor is that the present invention calls "stator portion".

Figure 2:
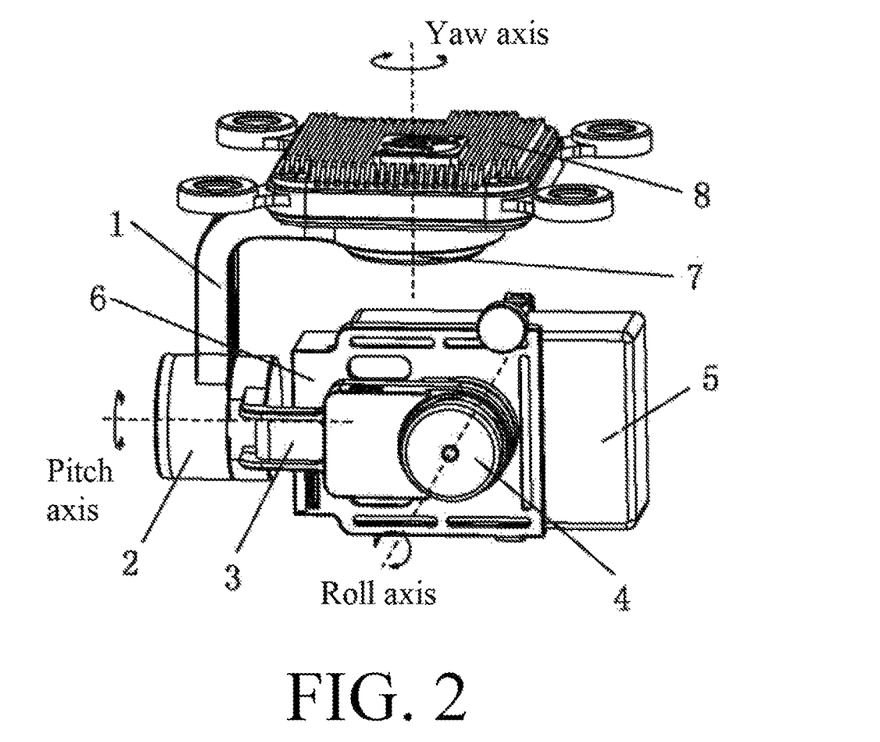
FIG. 2 is a stereogram in which the optical axis of a lens and a roll shaft of a photographic assembly are in parallel according to the present invention.

A photographic assembly shown in FIG. 2 is connected to a vehicle body of an unmanned aerial vehicle by a gimbal base 8. The photographic assembly includes a pitch motor 2, a roll motor 4 and a camera 5.

The pitch motor 2 includes a second stator portion and a second rotor portion coupled to the second stator portion. The second rotor portion is capable of rotating around a pitch axis relative to the second stator portion. The roll motor 4 includes a third stator portion and a third rotor portion coupled to the third stator portion. The third rotor portion is capable of rotating around a roll axis relative to the third stator portion. In the present invention, the second rotor portion is coupled to the third stator portion of the roll motor 4, so that a connection manner of the photographic assembly is a pitch-roll manner. Therefore, when the roll motor 4 is working, a displacement variation of an envelope curve of a route of the camera 5 along the pitch axis is small. That is, a rotation interference phenomenon is weakened, so that a rotation space that needs to be reserved between the camera 5 and the roll motor 4 is correspondingly reduced. That is, distances between the centre of gravity of the camera 5 and the motors are decreased. Therefore, the photographic assembly becomes more compact at some portions, thereby achieving an objective that the volume, the weight and the moment of inertia are reduced. When the weight is reduced to some extent, even a small-sized motor may be used to drive the photographic assembly.

In an embodiment of the present invention, the second rotor portion of the pitch motor 2 is a rotor of the pitch motor 2 and the second stator portion is a stator of the pitch motor 2. The third rotor portion of the roll motor 4 is a rotor of the roll motor 4 and the third stator portion is a stator of the roll motor 4. In other possible embodiment, the second rotor portion may also be a stator of the pitch motor 2 and the second stator portion may be a rotor of the pitch motor 2. The third rotor portion may be a stator of the roll motor 4 and the third stator portion may be a rotor of the roll motor 4.

Figure 3:
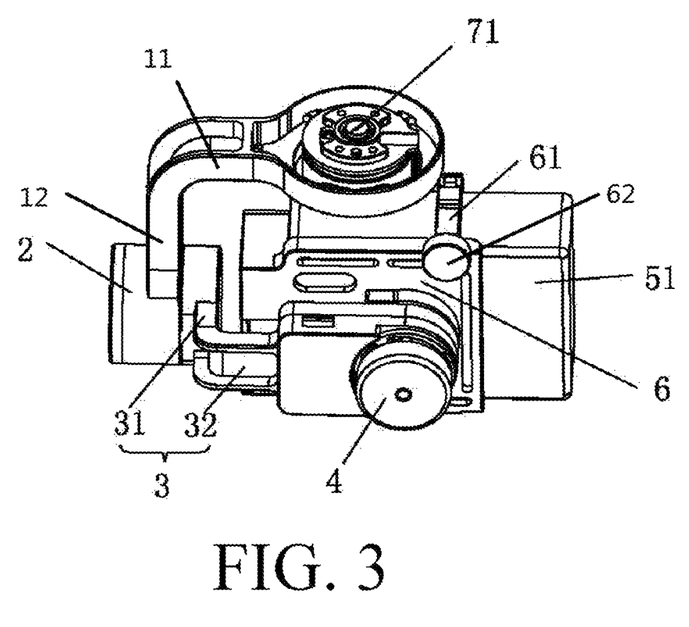
FIG. 3 is a stereogram in which the photographic assembly shown in FIG. 2 is not mounted on a gimbal base.

In the present invention, as shown in FIG. 3, the photographic assembly further includes a pitch connection arm 3. The pitch axis connection arm 3 includes a first arm 31 and a second arm 32 connected to the first arm 31. The first arm 31 is connected to the second rotor portion of the pitch motor 2 and is substantially parallel to the roll axis. The second arm 32 is connected to the third stator portion of the roll motor 4 and is substantially perpendicular to the roll axis. Therefore, the pitch axis connection arm 3 is substantially L-shaped. In other possible embodiment, the pitch axis connection arm 3 also can be arc-shaped.

In an embodiment of the present invention, a distance between the first arm 31 and the roll axis is greater than a maximum radius that the camera 5 rotates around the roll axis, so that an accommodation space accommodating the camera 5 may be formed between the first arm 31 and the second arm 32. In addition, in a process in which the camera 5 rotates around the roll axis, interference between the camera 5 and the pitch motor 2 is also avoided.

In some embodiment of the present invention, there may be two pitch motors and one roll motor. The stator portions of the two pitch motors are connected to the vehicle body of the unmanned aerial vehicle respectively and the camera is connected between the two pitch motors. The roll motor is disposed inside the camera to drive a lens of the camera to rotate about the roll axis.

In other possible embodiment, the photographic assembly further includes a yaw motor 7 comprising a first stator portion and a first rotor portion coupled to the first stator portion. The first rotor portion is capable of rotating around a yaw axis relative to the first stator portion. The first stator portion is connected to the vehicle body of the unmanned aerial vehicle by the gimbal base 8 and the first rotor portion is coupled to the second stator portion of the pitch motor. In some embodiment, the first rotor portion is a rotor of the yaw motor 7 and the first stator portion is a stator of the yaw motor 7. Alternatively, the first rotor portion may also be a stator of the yaw motor 7 and the first stator portion may be a rotor of the yaw motor 7. In this embodiment, the photographic assembly is connected in a yaw-pitch-roll manner.

When the photographic assembly includes a yaw motor 7, the photographic assembly may further includes a yaw axis connection arm 1. Referring to FIG. 3, the yaw axis connection arm 1 may include a first portion 11 and second portion 12 connected to the first portion 11. The first portion 11 is connected to the first rotor portion of the yaw motor 7 and is substantially perpendicular to the yaw axis. The second portion 12 is connected to the second stator portion of the pitch motor 2 and is substantially parallel to the yaw axis. Therefore, the yaw axis connection arm 1 is substantially L-shaped. In other possible embodiment, the yaw axis connection arm 1 also can be arc-shaped.

In above described embodiment, the yaw axis connection arm 1 and the pitch axis connection arm 3 are disposed perpendicular to each other, so that the yaw motor 7, the pitch motor 2 and the roll motor 4 whose rotation axes are pairwise perpendicular to each other are connected by using the yaw axis connection arm 1 and the pitch axis connection arm 3. That is, rotation of the camera 5 around three directions of yaw, pitch and roll is implemented.

Figure 4:
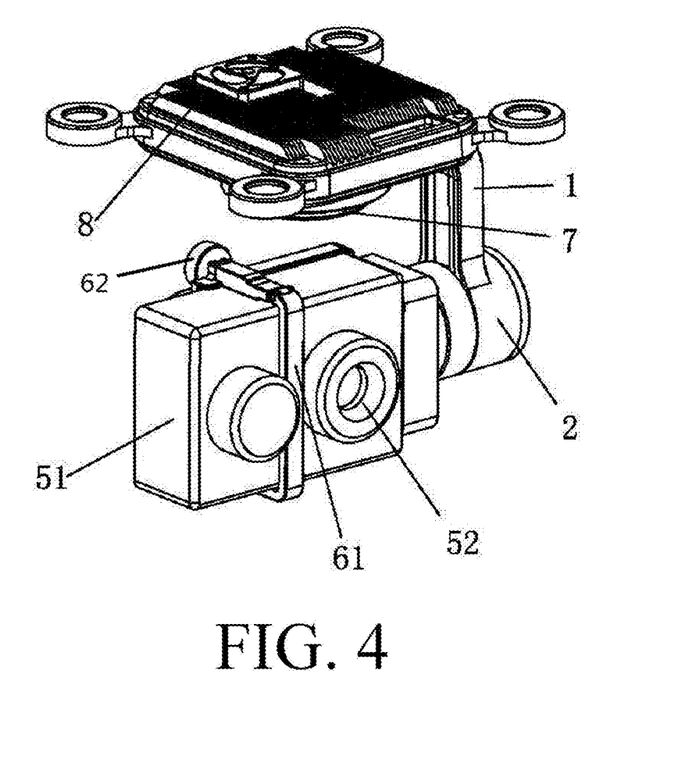
FIG. 4 is a stereogram of the photographic assembly shown in FIG. 2 in another angle.

Referring to FIG. 3 and FIG. 4, the camera 5 is coupled to the third rotor portion of the roll motor 4. The camera 5 may include a body 51 and a lens 52 coupled to the body 51. The optical axis of the lens 52 is parallel to or coincided with the roll axis. In some embodiment, the camera 5 may be a thermal imaging camera or other types of camera. In some embodiment of the present invention, the photographic assembly may further includes a mounting frame 6 for connecting the camera 5 to the third rotor portion of the roll motor 4. In other possible embodiment, the camera 5 may be connected to the rotor portion of the roll motor 4 directly. Further, the mounting frame 6 may be provided with a bind buckle 61 for detachably connecting the camera 5 to the mounting frame 6. The bind buckle 61 has an adjusting member 62. By means of screwing the adjusting member 62, mounting or disassembling of the camera 5 can be implemented. This type of bind buckle 61 is capable of realizing mounting of different types of cameras.

Figure 5:
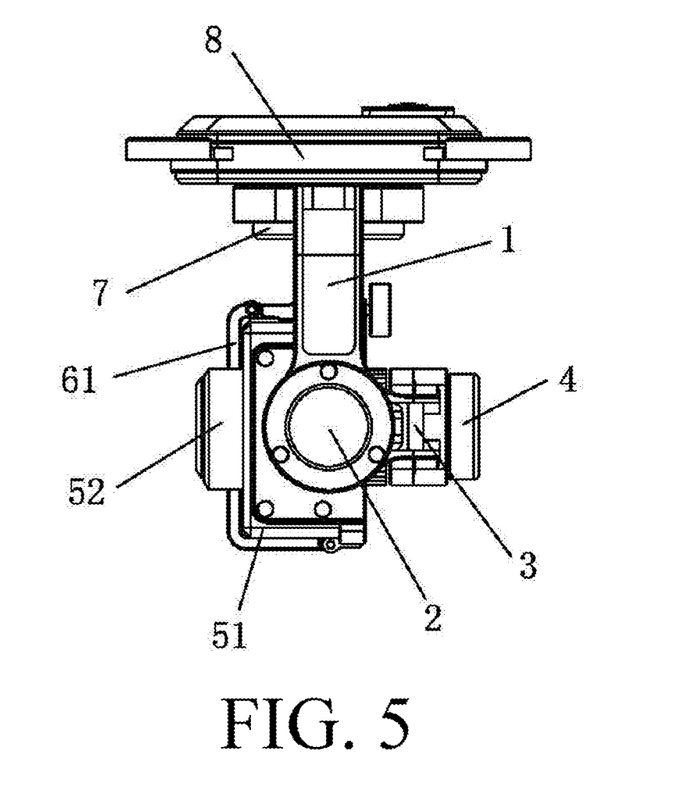
FIG. 5 is a left view of the photographic assembly shown in FIG. 2.
Figure 6:
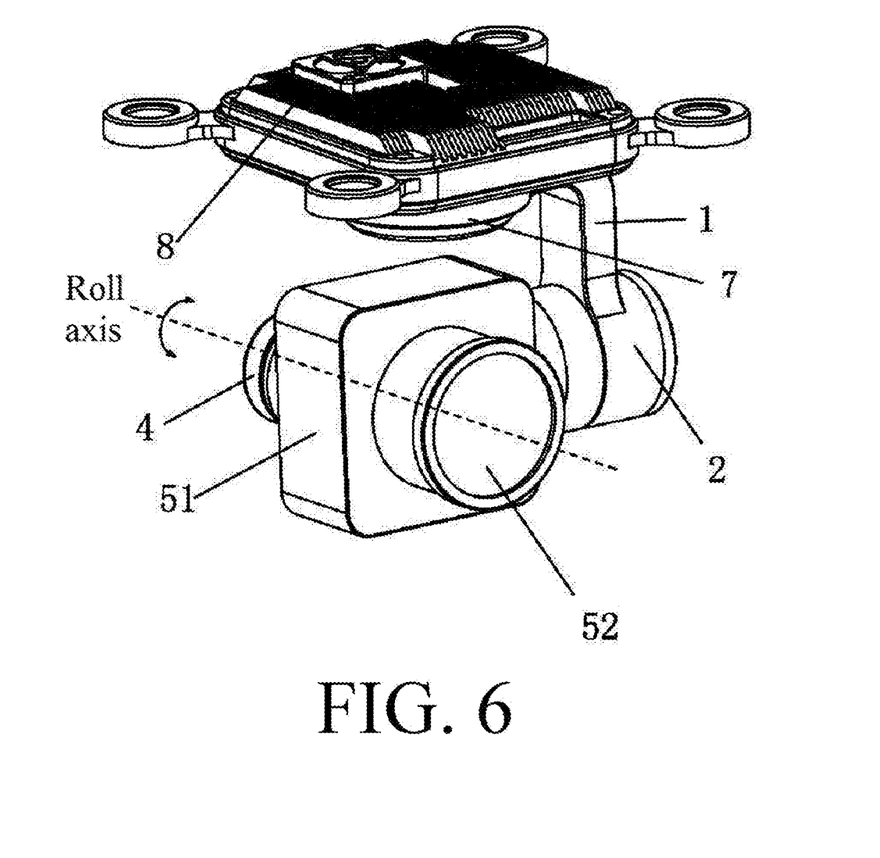
FIG. 6 is a stereogram in which the optical axis of a lens and a roll shaft of a photographic assembly overlap according to the present invention.

FIG. 4 and FIG. 5 show an embodiment in which the optical axis of the lens 52 and the roll axis are in parallel. FIG. 6 shows an embodiment in which the optical axis of the lens 52 and the roll axis overlap and the body 51 and the third rotor portion are directly and fixedly connected. In the two manners, the length of the camera 5 along the pitch axis is greater than the length of the camera 5 along the roll axis, and the length of the lens 52 along the roll axis is less than or equal to twice the length of the body 51 along the roll axis, so that the accommodation space formed by the first arm 31 and the second arm 32 is effectively used and a phenomenon that the centre of gravity of the camera 5 is far away from the body 51 caused by the excessively large lens 52 is avoided. Therefore, the distances between the centre of gravity of the camera 5 and the motors are within a particular distance range. That is, an objective that the photographic assembly is more compact at some portions is achieved.

In addition, a mounting surface of the body 51 that is mounted with the third rotor portion is central symmetric, an end portion of the third rotor portion being located at the symcenter of the mounting surface, so that minimization of the moment of inertia when the camera 5 rotates along the roll axis is ensured.

In an embodiment, an unmanned aerial vehicle is further provided. The unmanned aerial vehicle includes a body, a vibration reduction apparatus, a gimbal base and the foregoing photographic assembly. The photographic assembly is connected to the body by using the gimbal base and the vibration reduction apparatus is disposed between the body and the gimbal base to reduce vibration, to ensure that a high-quality image can be obtained by the camera.

Obviously, the foregoing embodiments are merely examples for clear description, but are not intended to limit the implementations. A person of ordinary skill in the art may further make changes or modifications in other different forms based on the foregoing descriptions. Herein, there is no need to exhaust all implementations. Obvious changes or modifications derived from the foregoing descriptions still fall within the protection scope of the present invention.

What is claimed is:

1. A photographic assembly, comprising:
   a pitch motor, comprising a first stator portion and a first rotor portion coupled to the first stator portion, wherein the first rotor portion is capable of rotating around a pitch axis relative to the first stator portion;
   a roll motor, comprising a second stator portion and a second rotor portion coupled to the second stator portion, wherein the second rotor portion is capable of rotating around a roll axis relative to the second stator portion; and
   a camera, the camera being coupled to the second rotor portion of the roll motor, an optical axis of the camera being coincides with or parallel to the roll axis;
   wherein the first rotor portion of the pitch motor is coupled to the second stator portion of the roll motor by a pitch axis connection arm;
   wherein the pitch axis connection arm comprises a first arm and a second arm connected to the second arm;
   wherein the first arm is connected to the first rotor portion of the pitch motor and the first arm is substantially parallel to the roll axis;
   wherein the second arm is connected to the second stator portion of the roll motor and the second arm is substantially perpendicular to the roll axis;
   wherein a distance between, the first arm and the roll axis is greater than a maximum radius that the camera rotates around the roll axis.

2. The photographic assembly according to claim 1 further comprising a yaw motor, the yaw motor comprising a third stator portion and a third rotor portion coupled to the third stator portion, wherein the third rotor portion is capable of rotating around a yaw axis relative to the third stator portion and the third rotor portion is coupled to the first stator portion of the pitch motor.

3. The photographic assembly according to claim 2, wherein the third rotor portion is connected to the first stator portion of the pitch motor by a yaw axis connection arm.

4. The photographic assembly according to claim 3, wherein the yaw axis connection arm comprises a first portion and a second portion connected to the first portion;
   wherein the first portion is connected to the third rotor portion of the yaw motor and the first portion is substantially perpendicular to the yaw axis;
   wherein the second portion is connected to the first stator portion of the pitch motor and the second portion is substantially parallel to the yaw axis.

5. The photographic assembly according to claim 1, further comprising a mounting frame coupled to the second rotor portion of the roll motor, wherein the camera is detachably connected to the mounting frame.

6. The photographic assembly according to claim 5, wherein the mounting frame is provided with a bind buckle for detachably connecting the camera to the mounting frame.

7. The photographic assembly according to claim 1, wherein the camera comprises a body and a lens coupled to the body, the body being coupled to the second rotor portion of the roll motor and the optical axis of the lens is coincided with or parallel to the roll axis.

8. The photographic assembly according to claim 7, wherein a length of the body along the pitch axis is greater than a length of the body along the roll axis.

9. The photographic assembly according to claim 7, wherein a length of the lens along the roll axis is less than or equal to twice a length of the body along the roll axis.

10. An unmanned aerial vehicle, comprising:
a vehicle body;
a gimbal base, coupled to the vehicle body;
a vibration reduction apparatus sandwiched between the vehicle body and the gimbal base; and
a photographic assembly, the photographic assembly being connected to the gimbal base;
wherein the photographic assembly comprises:
a pitch motor, comprising a first stator portion and a first rotor portion coupled to the first stator portion, wherein the first rotor portion is capable of rotating around a pitch axis relative to the first stator portion;
a roll motor, comprising a second stator portion and second rotor portion coupled to the second stator portion, wherein the second rotor portion is capable of rotating around a roll axis relative to the second stator portion; and
a camera, the camera being coupled to the second rotor portion of the roll motor, an optical axis of the camera being coincides with or parallel to the roll axis;
wherein the first rotor portion of the pitch motor is coupled to the second stator portion of the roll motor by a pitch axis connection arm;
wherein the pitch axis connection arm comprises a first arm and a second arm connected to the second arm;
wherein the first arm is connected to the first rotor portion of the pitch motor and the first arm is substantially parallel to the roll axis;
wherein the second arm connected to the second stator portion of the roll motor and the second arm is substantially perpendicular to the roll axis;
wherein a distance between the first arm and the roll axis is greater than a maximum radius that the camera rotates around the roll axis.

11. The photographic assembly according to claim 10 further comprising a yaw motor, the yaw motor comprising a third stator portion and a third rotor portion coupled to the third stator portion, wherein the third rotor portion is capable of rotating around a yaw axis relative to the third stator portion and the third rotor portion is coupled to the first stator portion of the pitch motor.

12. The photographic assembly according to claim 11, wherein the third rotor portion is connected to the first stator portion of the pitch motor by a yaw axis connection arm.

13. The photographic assembly according to claim 12, wherein the yaw axis connection arm comprises a first portion and a second portion connected to the first portion;
wherein the first portion is connected to the third rotor portion of the yaw motor and the first portion is substantially perpendicular to the yaw axis;
wherein the second portion is connected to the first stator portion of the pitch motor and the second portion is substantially parallel to the yaw axis.

14. The photographic assembly according to claim 10, further comprising a mounting frame coupled to the second rotor portion of the roll motor, wherein the camera is detachably connected to the mounting frame.

15. The photographic assembly according to claim 14, wherein the mounting frame is provided with a bind buckle for detachably connecting the camera to the mounting frame.

16. The photographic assembly according to claim 10, wherein the camera comprises a body and a lens coupled to the body, the body being coupled to the second rotor portion of the roll motor and the optical axis of the lens is coincided with or parallel to the roll axis.

17. The photographic assembly according to claim 16, wherein a length of the body along the pitch axis is greater than a length of the body along the roll axis.

18. The photographic assembly according to claim 16, wherein a length of the lens along the roll axis is less than or equal to twice a length of the body along the roll axis.

* * * * *